(12) United States Patent
Hirata et al.

(10) Patent No.: US 7,888,398 B2
(45) Date of Patent: Feb. 15, 2011

(54) PIGMENT

(75) Inventors: Naoki Hirata, Tokyo (JP); Hisao Okamoto, Tokyo (JP); Yoshiyuki Zama, Tokyo (JP); Michiei Nakamura, Tokyo (JP); Tetsuya Yanagimoto, Kisarazu (JP); Hiroaki Yamada, Kisarazu (JP); Masahiro Tsuchiya, Kisarazu (JP)

(73) Assignee: Dainichiseika Color & Chemicals Mfg. Co., Ltd., Tokyo (JP)

( * ) Notice: Subject to any disclaimer, the term of this patent is extended or adjusted under 35 U.S.C. 154(b) by 247 days.

(21) Appl. No.: 11/658,053
(22) PCT Filed: Jul. 26, 2005
(86) PCT No.: PCT/JP2005/013625
§ 371 (c)(1), (2), (4) Date: Jan. 19, 2007
(87) PCT Pub. No.: WO2006/011467
PCT Pub. Date: Feb. 2, 2006

(65) Prior Publication Data
US 2008/0096999 A1 Apr. 24, 2008

(30) Foreign Application Priority Data

Jul. 29, 2004 (JP) ............................. 2004-222317
Jul. 29, 2004 (JP) ............................. 2004-222318

(51) Int. Cl.
C07D 295/033 (2006.01)
C07D 209/02 (2006.01)
C07F 5/02 (2006.01)
C09B 67/22 (2006.01)
C09B 67/50 (2006.01)
C09D 11/00 (2006.01)

(52) U.S. Cl. .................. 522/75; 548/405; 548/416; 548/471; 540/128; 106/410; 106/411; 106/31.76; 106/31.78

(58) Field of Classification Search ............... 106/31.77, 106/410, 411, 31.76, 31.78; 349/108; 522/75; 540/137, 128; 548/405, 416, 471
See application file for complete search history.

(56) References Cited

U.S. PATENT DOCUMENTS 6,368,395 B1 4/2002 Nohr et al. ................ 106/31.47

(Continued)

FOREIGN PATENT DOCUMENTS

GB 2 290 489 A 1/1996

(Continued)

OTHER PUBLICATIONS

Machine Translation of WO/2004/067644, Aug. 2004.*
Potz, R. et al., "Synthesis and Structural Characterization of Boron Subphthalocyaninates", Anorg. Allg. Chem., vol. 626, pp. 588-596 (2000).

*Primary Examiner*—Mark Eashoo
*Assistant Examiner*—Michael Pepitone
(74) *Attorney, Agent, or Firm*—Kubovcik & Kubovcik

(57) ABSTRACT

This present invention can provide a novel pigment useful in color image displays to form blue pixels capable of providing high-level brightness and saturation, especially a finely-divided pigment which has bright hue and is excellent in pigment physical properties such as light fastness, solvent resistance and heat resistance, and a process for producing the same, a pigment dispersion making use of the pigment, and an ink for a color filters. The novel pigment is produced by forming into a pigment a subphthalocyanine represented by the following formula (1):

Formula (1)

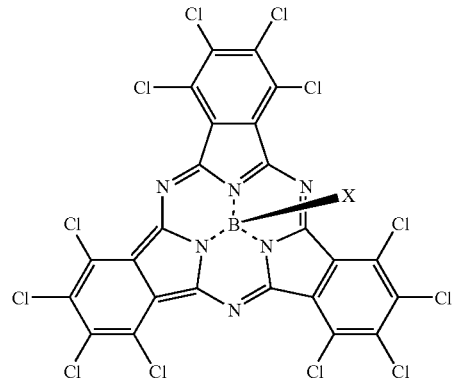

wherein X is a halogen atom, presents diffraction peaks at diffraction angles (2θ) 7.0°, 12.3°, 20.4° and 23.4° in x-ray diffraction, and has an average particle size of 120 to 20 nm.

5 Claims, 3 Drawing Sheets

U.S. PATENT DOCUMENTS

| | | | |
|---|---|---|---|
| 6,716,897 B2 * | 4/2004 | Okutsu et al. | 524/88 |
| 2006/0112856 A1 * | 6/2006 | Brychcy et al. | 106/412 |

FOREIGN PATENT DOCUMENTS

| | | |
|---|---|---|
| JP | 5-281414 A | 10/1993 |
| JP | 2543052 B2 | 7/1996 |
| JP | 10-330633 A | 12/1998 |
| JP | 11-024255 A | 1/1999 |
| JP | 2003-500510 A | 1/2003 |
| JP | 2004-10838 A | 1/2004 |
| JP | 2005-200601 A | 7/2005 |
| WO | WO 9424612 A1 * | 10/1994 |
| WO | 00/71621 A1 | 11/2000 |
| WO | WO 2004/052996 * | 6/2004 |
| WO | 2004/067644 A1 | 8/2004 |
| WO | WO 2004/067644 * | 8/2004 |
| WO | 2006/011446 A1 | 2/2006 |

* cited by examiner

PIGMENT

This application is a 371 of international application PCT/JP2005/013625, which claims priority based on Japanese patent application Nos. 2004-222317 and 2004-222318 filed Jul. 29, 2004, which are incorporated herein by reference.

TECHNICAL FIELD

This invention relates to a pigment, its production process, a pigment dispersion, and an ink for forming pixels on color filters (hereinafter called "an ink for color filters"). It is to be noted that in the present invention, the term "subphthalocyanine" means a subphthalocyanine before its processing into a pigment while the term "subphthalocyanine pigment" means a subphthalocyanine finely divided into a pigment. It is also to be noted that the term "ratio" means a conversion rate of a halogen atom, which is coordinating to a boron atom, into a residual group (hereinafter called "an alcohol residue"), which has been formed by removing the hydrogen atom from a hydroxyl group of a hydroxyl-containing, water-soluble organic solvent (hereinafter called "an alcohol"), as determined by high-performance liquid chromatography and expressed in terms of their area ratio.

BACKGROUND ART

Conventionally, color filters have been widely used in color liquid crystal displays. In these color filters, red, green and blue pixels are arranged generally in a mosaic pattern. For the fabrication of such color filters, known processes include the dyeing process, the printing process, the electrodeposition process, the below-described process using a photosensitive ink, in which a pigment has been dispersed, and so on. In particular, the above photosensitive ink-using process that forms pixels by photolithography, which uses the photosensitive inks each produced by dispersing a pigment together with a photosensitive resin and/or monomer, has become a mainstream process for the fabrication of color filters, because the resulting pixels are excellent in light fastness, heat resistance and solvent resistance owing to the use of the pigments as colorants.

In general, many of known pigments are usable in the above photosensitive ink-using process. For example, Patent Document 1 discloses as many as several tens of red, green, blue, yellow and violet pigments as colorants for color resist inks. Further, pigments to be used for the formation of individual pixels are generally selected such that the visible light transmission characteristics of the pixels will be in conformity with the luminance characteristics of light from a backlight. For example, desired transmission characteristics are imparted to the individual pixels by mixing a yellow pigment and orange pigment in predetermined proportions in addition to a red pigment in the case of the red pixels, mixing a yellow pigment in a predetermined proportion in addition to a green pigment in the case of the green pixels, and mixing a violet pigment in a predetermined proportion in addition to a blue pigment in the case of the blue pixels.

Under the circumstances of these days that there has been a desire of still higher brightness and saturation for color filters to meet an ever-increasing demand of higher definition, higher brightness and higher color reproducibility for liquid crystal displays in recent years, only an extremely limited fraction of these pigments, however, can show high-level brightness and saturation when employed in liquid crystal displays. For example, a violet pigment is often used together with Pigment Blue 15:6, a phthalocyanine blue pigment, in a color resist ink for blue pixels. As this violet pigment, Pigment Violet 23, a carbazole dioxazine pigment, is practically only one example that can be appropriately used, as disclosed in Patent Document 2.

This Pigment Violet 23 is frequently used to heighten the blue color purity of a copper phthalocyanine blue pigment that slightly transmits a green-color light, because its blue-color transmission range is located on the shorter wavelength side than that of a copper phthalocyanine blue pigment. In an approach that involves the mixing of two pigments of different transmission ranges, however, higher brightness and higher saturation are in a mutually-exclusive relation. The approach that employs Pigment Violet 23, the transmission range of which is significantly different from the copper phthalocyanine blue pigment and the transmittance of which is also low, involves a problem in that it cannot satisfy high-level brightness and high-level saturation at the same time. Moreover, Pigment Violet 23 is hardly dispersible as fine particles in a solvent and is high in polarizability, and therefore, is accompanied by a problem that, when mixed with a copper phthalocyanine blue pigment, the resulting blue pixels of a color filter are provided with a substantially-reduced contrast value, leading to a liquid crystal display equipped with deteriorated color display performance.

For color resist inks to be used upon fabrication of a color filter useful in a liquid crystal display or the like, it is essential to prepare colorants having transmission characteristics suited for its application purpose or object as described above. Accordingly, there has been a desire for a blue resist ink which makes use of a pigment other than Pigment Violet 23 and is useful for the formation of a color filter of higher contrast.

Patent Document 1: JP-A-5-281414

Patent Document 2: JP-B-2543052

DISCLOSURE OF THE INVENTION

The present invention has been completed in view of the drawbacks of such conventional art. Objects of the present invention are, therefore, to provide a novel pigment for the formation of blue pixels useful in a color image display or the like and capable of providing high-level brightness and saturation, especially a finely-divided pigment which has a bright hue and is excellent in pigment physical properties such as light fastness, solvent resistance and heat resistance, and also its production process. Further objects of the present invention are to provide a pigment dispersion and an ink for color filters.

Means for Solving the Problems

The present inventors have diligently strived to solve the above-described problems. As a result, it has been found that a subphthalocyanine pigment is suited as a colorant for a blue-pixel-forming color ink, in particular, kneading of a subphthalocyanine with a specific water-soluble organic solvent and inorganic salt makes it possible to obtain a finely-divided subphthalocyanine pigment with a narrow particle size distribution, and use of the pigment as a colorant can form colored pixels excellent in light fastness, heat resistance and solvent resistance and further, can obtain a high-contrast color filter.

The followings are principal aspects of the present invention:

1. A subphthalocyanine pigment produced by forming a subphthalocyanine, which is represented by the following formula (1):

Formula (1)

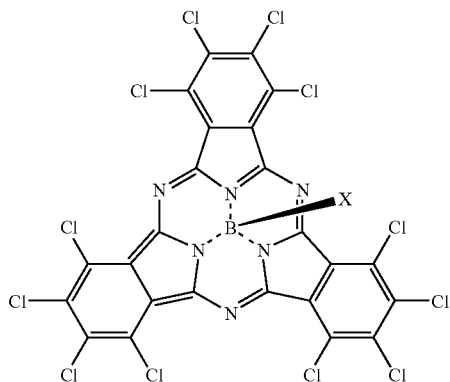

wherein X is a halogen atom, into a pigment, presenting diffraction peaks at diffraction angles (2θ) of at least 7.0°, 12.3°, 20.4° and 23.4° in x-ray diffraction, and having an average particle size of 120 to 20 nm; and a production process of the same.

2. A subphthalocyanine pigment represented by formula (1), in which X consists of (A) a halogen atom and (B) a residual group formed by removing a hydrogen atom from a hydroxyl group in a hydroxyl-containing, water-soluble organic solvent and a ratio (A:B) of the halogen atom to the residual group is 98:2 to 0:100, presenting broad diffraction peaks over diffraction angles (2θ) of 20° to 30° in x-ray diffraction, and having an average particle size of 120 to 20 nm; and a production process of the same.

3. A pigment dispersion comprising a medium and a subphthalocyanine pigment of any one of the above-described aspects of the present invention; and an ink for color filters, comprising the pigment dispersion as a colorant component.

Advantageous Effects of the Present Invention

According to the above-described present invention, the kneading of the subphthalocyanine with the inorganic salt and water-soluble organic solvent into fine particles makes it possible to obtain the subphthalocyanine pigment. This pigment is excellent in brightness, saturation, heat resistance and the like, and a color filter available from the use of an ink, which contains a dispersion of the pigment as a colorant, has high-level brightness, saturation and contrast. The pigment is, therefore, extremely useful in manufacturing a high-quality liquid crystal display. In addition to inks for color filters, the pigment dispersion according to the present invention is also useful as a colorant for paints required to have high glossiness, writing inks required to have high transparency, inks for inkjet printers, printing inks, and the like.

BEST MODES FOR CARRYING OUT THE INVENTION

The present invention will next be described in further detail based on best modes for carrying it out.

(Subphthalocyanine)

A synthesis process of a subphthalocyanine is well known, and is disclosed as early as in A. Meller and A. Ossko, Monatshefte fur Chemie, 103, 150-155 (1972), etc. A subphthalocyanine can be synthesized stoichiometrically by reacting 1 mole of a boron compound such as boron halide with 3 moles of phthalonitrile one or more of the hydrogen atoms on the benzene skeleton of which may be substituted by a like number of halogen atoms as needed.

The above-described subphthalocyanine represented by formula (1) can be synthesized, for example, by reacting 1 mole of boron trihalide with 3 moles of tetrachlorophthalonitrile. The subphthalocyanine obtained as described above often contains impurities formed through side reactions or the like. Such impurities can, however, be removed by conducting, for example, filtration and washing or Soxhlet extraction. No particular limitation is imposed on a solvent to be used in such filtration and washing or Soxhlet extraction. For example, an alcoholic solvent such as methanol or ethanol, a ketone solvent such as acetone or methyl ethyl ketone, an aromatic solvent such as toluene or xylene, or the like can be used. As an alternative, it is also possible to synthesize a substituted or unsubstituted subphthalocyanine by using phthalonitrile or a phthalonitrile, which is substituted with one or more substituents other than chlorine atom or atoms, as a starting raw material as needed and then to conduct chlorination by a method known per se in the art. It is, however, to be noted that the synthesis process and purification method shall not be limited to the above-described process and method.

(First Pigment)

The first subphthalocyanine pigment according to the present invention is characterized in that it is produced by forming the subphthalocyanine of formula (1), in which X is represented by a halogen atom, into a pigment; it presents diffraction peaks at diffraction angles (2θ) of at least 7.0°, 12.3°, 20.4° and 23.4° in x-ray diffraction; and it has an average particle size of 120 to 20 nm.

(Production Process of the First Pigment)

The first pigment can be obtained by kneading a subphthalocyanine of formula (1), in which X is represented by a halogen atom, together with an inert (which means to have no reactivity with the subphthalocyanine) water-soluble organic solvent and inorganic salt in a kneader. In particular, the production process is characterized in that X represented by formula (1) is not replaced by any substituent other than a halogen atom and is still a halogen atom.

The subphthalocyanine in its synthesized form (in the form before having been formed into the pigment) may preferably present strong diffraction peaks at diffraction angles (2θ) of at least 6.9°, 7.4°, 20.2° and 20.6° in x-ray diffraction, and may also present additional diffraction peaks at 26.6° and 30.0°. Insofar as a subphthalocyanine presents these diffraction peaks, the kneading in its formation into a pigment can readily convert the strong peaks over the diffraction angles (2θ) of 7° to 30° into somewhat broader peaks as it is divided into finer particles, thereby providing a subphthalocyanine pigment which presents relatively strong peaks around 7.0°, 12.3°, 20.4° and 23.4°.

When kneaded together with an inorganic salt and a water-soluble organic solvent, for example, an inert, water-soluble organic solvent, the subphthalocyanine is finely divided and is at the same time formed into near-spherical particles, that is, into a pigment having transparency, vividness, a bright hue, and resistance and fastness such as heat resistance and light fastness. Especially when employed as a colorant in an ink for color filters, it is possible to form blue pixels excellent in brightness and saturation and high in contract. It is to be noted that the average particle size of the pigment was observed and measured by using its transmission electron micrograph.

The first subphthalocyanine pigment can be obtained by finely dividing the subphthalocyanine of formula (1), in which X represents a halogen atom, in an appropriate manner. Several processes will hereinafter be exemplified, although the present invention shall not be limited to them. (1) The subphthalocyanine is charged together with a water-soluble inorganic salt such as sodium chloride or sodium sulfate and an inert, water-soluble organic solvent in appropriate proportions into a kneader. After the contents were kneaded for a predetermined time while controlling the temperature, the mass is introduced into water. Subsequent to stirring, the solid matter is collected by filtration, washed with water to remove the inorganic salt and water-soluble organic solvent, and then dried with warm air or the like.

As the inert, water-soluble organic solvent, conventionally-known inert, water-soluble organic solvents are all usable. Preferred are water-soluble organic solvents having no hydroxyl group, for example, solvents which are derivatives of monohydric or polyhydric alcohols, with the hydroxyl groups thereof having been all etherified or esterified. Ether compounds are particularly preferred. Illustrative are polyalkyl ethers of polyhydric alcohols, such as alkylene glycol dialkyl ethers and polyalkylene glycol dialkyl ethers.

More specific examples include water-soluble organic solvents such as ethylene glycol dimethyl ether, diethylene glycol dimethyl ether, diethylene glycol diethyl ether, diethylene glycol dipropyl ether, dipropylene glycol dimethyl ether, triethylene glycol dimethyl ether, tetraethylene glycol dimethyl ether, polyethylene glycol dimethyl ether, and polyethylene glycol dibutyl ether. It is, however, to be noted that the water-soluble organic solvent having no hydroxyl group shall not be limited to the above-exemplified ones.

In general, monohydric or polyhydric alcohols having no primary hydroxyl group have no or low reactivity with the central boron atom of a subphthalocyanine, and, accordingly, such alcohols can also be used as inert, water-soluble organic solvents. Illustrative are, but are not limited to, 2-butyl alcohol, tert-butyl alcohol, 2,3-butanediol, 2,4-pentanediol, 2-methyl-2,3-butanediol, 2-methyl-2,4-pentanediol, 2,3-dimethyl-2,3-pentanediol, 2,4-dimethyl-2,4-pentanediol, cyclopentanediol, 1-methoxy-2-propanol, 2-methyl-3-methoxy-2-propanol.

(2) Other Processes

Although the process (1) is preferred as a production process of the first pigment, other processes may also be used. For example, a process in which the subphthalocyanine is ground down by friction with an inert, water-soluble organic solvent in a ball mill or oscillating mill is also useful. In these processes, a grinding medium such as steel balls or steel rods is used, and an inorganic salt may also be used as a milling aid as needed. Examples of the milling aid include, but are not limited to, aluminum nitrate in addition to the above-described sodium chloride and sodium sulfate.

The first pigment obtained by such a process as described above is required to have an average particle size in the range of 120 to 20 nm, with a range of 80 to 40 nm being preferred. An average pigment particle size greater than 120 nm leads to a color filter inferior in brightness and low in contrast because, when blue pixels of the color filter are formed with the pigment, the pixels are provided with a reduced light transmittance and tend to cause polarization. An average particle size smaller than 20 nm, on the other hand, leads to a pigment insufficient in the dispersion stability in a dispersion medium and also in various fastness and resistance.

Incidentally, it is important, for the formation of the first pigment into the above-described average particle size, to determine optimal conditions depending upon the amount ratio of the water-soluble inorganic salt to the subphthalocyanine, the kneading time, the processing temperature and the kind and amount of the inert, water-soluble organic solvent and then to conduct the pigment formation under the conditions. When a mixture composed of the above-described components is kneaded in a kneader, the resulting pigment particles may undergo crystal growth due to substantial frictional heat generated under strong shear force. The first pigment can, therefore, be obtained by contriving a cooling method to avoid such a temperature increase or by adding a crystal growth inhibitor such as a pigment derivative.

Examples of the pigment derivative include the sulfonic acid derivatives of subphthalocyanines, the sulfonic acid derivatives of copper phthalocyanines, the sulfonic acid derivatives of quinacridones, and the sulfonic acid derivatives of carbazole dioxazines. In addition, the phthalimide methyl derivatives of subphthalocyanines, copper phthalocyanines, quinacridones, carbazole dioxazines and the like are also effective for the inhibition of crystal growth.

Described in further detail, the pigment formation can be conducted by using the water-soluble inorganic salt 2 to 12 weight times, preferably 4 to 8 weight times as much as the subphthalocyanine and the inert, water-soluble organic solvent 0.3 to 2.0 weight times, preferably 0.6 to 1.5 weight times as much as the phthalocyanine and controlling the mass at 5 to 110° C., preferably 40 to 80° C. in a kneader. No particular limitation is imposed on the amount of the pigment derivative to be used. In general, however, the pigment derivative may be used in an amount of 0.5 to 50 wt. %, preferably 1 to 25 wt. % based on the subphthalocyanine. The kneading time differs depending upon the combination of the amount of the used inorganic salt, the amount of the used organic solvent, and the temperature of the contents. The first pigment of the above-described average particle size can be obtained in a shorter time as the inorganic acid is used in a greater amount and the temperature becomes lower.

(Second Pigment)

The second subphthalocyanine pigment according to the present invention is characterized in that it comprises the subphthalocyanine pigment represented by formula (1); X consists of (A) a halogen atom and (B) an alcohol residue; their ratio (A:B) is 98:2 to 0:100; it presents broad diffraction peaks over diffraction angles (2θ) of 20° to 30° in x-ray diffraction; and it has an average particle size of 120 to 20 nm. Preferably, A:B may be 70:30 to 0:100, with 50:50 to 0:100 being more preferred. Further, a value of B smaller than 2 cannot bring about sufficient advantageous effects because the substitution into the alcohol residue is insufficient.

When the subphthalocyanine of formula (1) in which X was a halogen atom was heated simply together with an alcohol, no conversion of the halogen atom into the alcohol residue took place. It has, however, been found that the kneading of the subphthalocyanine, which is represented by formula (1), together with an alcohol and an inorganic acid allows the subphthalocyanine to readily react with the alcohol and X is converted into the alcohol residue. As the percentage of conversion of X from the halogen atom into the alcohol residue in formula (1) becomes greater, the pigment is provided with greater compatibility with a dispersion medium owing to the alcohol residue, thereby providing color filter pixels, which are to be formed with a color filter ink making use of the pigment, with improved optical characteristics.

The subphthalocyanine of formula (1) in which X is a halogen atom may preferably present strong diffraction peaks around diffraction angles (2θ) of 6.9°, 7.4°, 20.2° and 20.6° in x-ray diffraction, and may also present additional diffraction peaks at 26.6° and 30.0°. Insofar as a subphthalocyanine presents these diffraction peaks, the kneading of the subphthalocyanine with an alcohol and an inorganic acid readily makes extremely broad the strong peaks over diffraction angles (2θ) of 20° to 30°. When kneaded together with an inorganic salt and at least an alcohol, the subphthalocyanine is finely divided and is at the same time formed into near-spherical particles, thereby providing pixels of a color filter, which are to be formed by using the pigment, with transparency, vividness, a bright hue, resistance and fastness such as heat resistance and light fastness, and high contrast all together. The conversion of X from the halogen atom into the alcohol residue was confirmed by an infrared absorption spectrum (IR spectrum), the percentage of the conversion was measured by high-performance liquid chromatography, and the particle size was observed and measured by using a transmission electron micrograph.

(Production Process of the Second Pigment)

A production process of the second subphthalocyanine pigment according to the present invention is characterized in that the subphthalocyanine of formula (1), in which X represents a halogen atom, is kneaded together with an alcohol and an inorganic salt. It is, however, to be noted that the second subphthalocyanine according to the present invention shall not be limited to the pigment produced by the above production process.

According to the production process of the second pigment according to the present invention, the target pigment can be obtained by charging the subphthalocyanine together with a water-soluble inorganic salt such as sodium chloride or sodium sulfate and (one or more) alcohols in appropriate proportions into a kneader, kneading the contents for a predetermined time while controlling the temperature, introducing the mass into water, stirring the resultant mixture, collecting the solid matter by filtration, washing the solid matter with water to remove the inorganic salt and alcohol, and then drying thus-washed solid matter with warm air or the like.

As the alcohol, a monohydric or polyhydric alcohol having one or more hydroxyl groups reactable with the central boron atom of the subphthalocyanine can be used. An alcohol having a primary hydroxyl group is particularly preferred for its high reactivity with the central boron. As the alcohol having a primary hydroxyl group, conventionally-known alcohols having a primary hydroxy group are all usable, with monohydric alcohols, polyhydric alcohols and polyhydric alcohol derivatives being preferred.

Examples include water-soluble organic solvents including alcoholic solvents such as ethanol and 1-propyl alcohol; alkylene glycol solvents such as ethylene glycol, diethylene glycol, triethylene glycol, polyethylene glycol and propylene glycol, and as their derivatives, glycol monomethyl ethers such as ethylene glycol monomethyl ether, diethylene glycol monomethyl ether and polyethylene glycol monomethyl ether; and glycerin solvents such as glycerin, diglycerin and polyglycerin, and as their derivatives, glycerin ethers. It is, however, to be noted that the alcohol is not limited to the above-exemplified ones.

The second pigment obtained by such a process as described above is required to have an average particle size in the range of 120 to 20 nm, with a range of 80 to 40 nm being preferred. An average pigment particle size greater than 120 nm leads to a color filter inferior in brightness and low in contrast because, when blue pixels of the color filter are formed with the pigment, the pixels are provided with a reduced light transmittance and tend to cause polarization. An average particle size smaller than 20 nm, on the other hand, leads to a pigment insufficient in the dispersion stability in a dispersion medium and also in various fastness and resistance.

Incidentally, it is important, for the formation of the second pigment into the above-described average particle size, to determine optimal conditions depending upon the amount ratio of the water-soluble inorganic salt to the subphthalocyanine—the kneading time, the processing temperature and the kind—and amount of the alcohol; and then to conduct the pigment formation under the conditions. When a mixture composed of the above-described components is kneaded in a kneader, the resulting pigment particles may undergo crystal growth due to substantial frictional heat generated under strong shear force. The second pigment can, therefore, be obtained by contriving a cooling method to avoid such a temperature increase or by adding a crystal growth inhibitor such as a pigment derivative, which is similar to that as described above with respect to the first pigment, in a similar proportion.

The first and second pigments are useful as colorants for various applications, for example, synthetic or natural resins, paints, printing inks, writing inks and inks for inkjet printers, and especially, are useful as colorants in blue-pixel-forming inks for color filters as will be described subsequently herein.

(Pigment Dispersion)

The pigment dispersion according to the present invention is a dispersion of one or both of the pigments of the present invention in a suitable liquid medium, for example, a vehicle for a paint, a printing ink, or an ink for color filters. As the solvent for use in the pigment dispersion, an ester, ketone, glycol ether, nitrogen-containing solvent or the like can be preferably used. Illustrative are: as esters, ethyl acetate, butyl acetate, ethyl lactate and γ-butyrolactone; as ketones, methyl isobutyl ketone and cyclohexanone; as glycol ethers, ethylcellosolve, ethylcellosolve acetate, propylene glycol monomethyl ether acetate and diethylene glycol dimethyl ether; and as nitrogen-containing solvents, dimethylformamide and dimethylacetamide. These solvents can be adequately selected depending upon the dispersibility of the pigment, the kinds of a resin and other additives to be added and the coatability, and can be used either singly or in combination.

No particular limitation is imposed on the method for preparing the pigment dispersion, and a known method can be used. For example, dispersion processing of the pigment by a paint shaker, sand mill, bead mill or the like can be mentioned. Upon preparation of the pigment dispersion, the subphthalocyanine may be singly dispersed or the subphthalocyanine and one or more other pigments may be added and codispersed in desired proportions; or a pigment dispersion prepared as described above may be mixed with one or more other pigment dispersions, which have been prepared separately, in desired proportions. In the pigment dispersion, various resins such as film-forming resins and various additives such as surfactants, surface control agents and defoaming agents can be mixed as needed.

In the pigment dispersion according to the present invention, one or more of other pigments and dyes may be used as colorant or colorants in combination with the subphthalocyanine pigment. As other colorants suited for the preparation of the blue pigment dispersion, blue or violet-pigments are preferred from the standpoint of the hue. Examples include Pigment Blue 15, 15:1, 15:2, 15:3, 15:4, 15:6, 16, 60 and 80; and Pigment Violet 19, 23 and 37. It is, however, to be noted that pigments usable in combination shall not be limited to these pigments. When another pigment or a dye is used in combination, no particular limitation is imposed on the amount of the pigment or dye to be used. However, the percentage of the subphthalocyanine pigment in the whole colorant may be set preferably at 5 wt. % or higher, more preferably at 20 wt. % or higher.

The total solids of the pigment dispersion may be preferably 1 to 90 wt. %, more preferably 5 to 80 wt. %. The percentage of the pigment in the pigment dispersion may be preferably 1 to 60 wt. %, preferably 5 to 50 wt. % based on the total solids of the pigment dispersion. It is to be noted that the term "total solids" means the components which remain after drying. In general, those left subsequent to the removal of volatiles such as the solvent make up the total solids.

The pigment dispersion according to the present invention is also used as a colorant for paints required to have high glossiness, inks for writing instruments, said inks being required to have high transparency, inks for inkjet printers, printing inks, and plastics. For such applications, materials suited for the respective applications are added.

(Ink for Color Filters)

The pigment dispersion according to the present invention is useful especially as a colorant in an ink for color filters. The ink for color filters may preferably make combined use of a dispersant to improve the dispersion stability of the pigment, with the pigment being controlled to a predetermined particle size range. It is also possible to add a film-forming resin, which can include a polymerizable resin and/or monomer, and other necessary components in accordance with a known fabrication process for color filters, for example, the photosensitive ink-using process, printing process or electrodeposition process.

The reason for the use of the subphthalocyanine pigment as a colorant in the ink of the present invention for color filters is attributed to the peculiar spectral characteristics which the pigment has. Described specifically, a three-band fluorescent lamp of high color-rendering property, which has sharp emissions at the wavelengths of three primary colors of red, green and blue (generally, 610 nm, 545 nm and 435 nm), is widely used as a backlight in a liquid crystal display. For the exhibition of high-level brightness and saturation with respect to each of red, green and blue colors, it is hence necessary to effectively transmit the emission of the corresponding one of these three wavelengths and to block the emissions of the remaining two wavelengths. A color filter fabricated by using an ink, which contains the subphthalocyanine pigment of the present invention as a principal colorant, shows excellent spectral characteristics that allow transmissions around 370 to 510 nm and in a wavelength range longer than 630 nm and has an absorption around 520 to 620 nm, and therefore, can effectively transmit a blue emission from the three-band fluorescent lamp while effectively blocking red and green emissions. A color filter available from the use of the ink of the present invention for color filters, therefore, has high-level brightness and saturation and can provide a liquid crystal display, which makes use of the ink, with high-level brightness and saturation.

The ink of the present invention for color filters is available in two forms, one making use of a non-photosensitive resin as a film-forming component, and the other a photosensitive resin. The ink with the photosensitive resin contained therein is a so-called color resist ink. This color resist ink contains a photosensitive resin and/or monomer and a photopolymerization initiator as essential components together with the pigment. In general, at least one of photopolymerizable resins, photopolymerizable oligomers and photopolymerizable monomers, each of which contains one or more ethylenically-unsaturated bonds, is contained as a photosensitive resin. It is only necessary for the color-resist ink to contain one that becomes a resin when the color resist ink is brought into a hardened form. Color resist inks, therefore, include those containing only components not resinified when the color resist inks are in unhardened forms.

Examples of the photopolymerizable resins, photopolymerizable oligomers and photopolymerizable monomers include (meth)acrylate esters such as 2-hydroxyethyl(meth)acrylate, 2-hydroxybutyl (meth)acrylate, 2-ethylhexyl(meth)acrylate, ethylene glycol di(meth)acrylate, diethylene glycol di(meth)acrylate, triethylene glycol di(meth)acrylate, pentaerythritol di(meth)acrylate, dipentaerythritol tetra(meth)acrylate, dipentaerythritol hexa(meth)acrylate, bisphenol A epoxy di(meth)acrylate, bisphenol F epoxy (meth)acrylate, and bisphenol fluorene epoxy di(meth)acrylate. Also included are vinyl resins such as acrylic acid (co)polymers, methacrylic acid (co)polymers and maleic acid (co)polymers; and resins containing ethylenic double bonds in side chains, such as polyethylene oxide, polyvinylpyrrolidone, polyamides, polyurethanes, polyethers and polyesters. They can be used either singly or in combination. These resins may desirably contain alkali-soluble substituent groups such as carboxyl groups or phenolic hydroxyl groups in side chains to enhance their developability after pattern exposure.

Examples of the photopolymerization initiator, on the other hand, include acetophenones such as acetophenone and p-tert-butylacetophenone; benzophenones such as benzophenone and p,p-bis(N,N-dimethylamino)benzophenone; benzoin ethers such as benzoin ethyl ether and benzoin tert-butyl ether; triazines such as 2-methyl-1-[4-(methylthio)phenyl]-2-morpholinopropan-1-one, 2-benzyl-2-(N,N-dimethylamino)-1-(4-morphelinophenyl)butane-1,3, 5-triazine and 2-(4-methoxyphenyl)-4,6-bis(trichloromethyl)-1,3,5-triazine; organic peroxides such as benzoyl peroxide and 3,3,4,4-tetra(tert-butylperoxycarbonyl)benzophenone; and sulfur compounds such as thioxanthone and 2,4-diethylthioxanthone. They can be used either singly or in combination.

To the color resist ink according to the present invention, a resin having alkali solubility may be added as a binder resin component in addition to the above-described components to improve the developability and film-forming ability. Illustrative are polyethylene oxide, polyvinylpyrrolidone, polyamides, polyurethanes, polyesters and polyethers, with those containing carboxyl groups in backbones or side chains and having excellent alkali developability being preferred. Such preferred resins include, for example, vinyl resins such as acrylic acid (co) polymers, methacrylic acid (co)polymers and maleic acid (co)polymers. In addition, those obtained by adding acid anhydrides to hydroxyl-containing resins are also useful. They can be used either singly or in combination.

As a process for producing the color resist ink, it is possible to disperse beforehand the subphthalocyanine pigment singly or together with another pigment in a solvent by using a dispersant to prepare a pigment dispersion and then to add a photosensitive resin component, a photopolymerization initiator and the like in the pigment dispersion; or to directly disperse the subphthalocyanine pigment in a liquid medium which contains a photosensitive resin. From the standpoint of the stability of the color resist ink, however, the former method is preferred.

The percentage of the pigment in the color resist ink can be selectively determined, as needed, depending upon the coloring density and the like. The color resist ink may contain preferably 5 to 60 wt. %, more preferably 10 to 50 wt. % of the pigment based on the total solids. A pigment percentage lower than 5 wt. % cannot fully exhibit the coloring performance, thereby failing to form good pixels for color filters. A pigment percentage higher than 60 wt. %, on the other hand, cannot exhibit effective pixel-forming ability in a photolithographic process. A color resist ink produced with the pigment added at the above-described percentage is optimal for use in color filters. By coating the color resist ink on a substrate for a color filer and patterning it into blue pixels, a color filter is obtained. The total solids of the color resist ink may be preferably 1 to 40 wt. %, more preferably 5 to 30 wt. %.

(Color Filter, and its Fabrication Process)

Using the color resist ink of the present invention, a color filter according to the present invention can be formed. For example, the color filter can be formed by coating the color resist ink of the present invention on a color filter substrate, conducting pattern exposure through an appropriate photomask, and conducting development to form blue pixels; and further, similarly forming red pixels and blue pixels with a suitable red color resist ink and green color resist ink, respectively.

To coat the color resist ink on the color filter substrate, a conventionally-known method can be used. For example, the coating can be performed by a coating machine such as a spin coater or bar coater. Subsequent to the coating, drying may be effected using a hot plate, IR oven or the like. To subject a coating of the color resist ink to pattern exposure, a conventionally-known method can be used including, for example, pattern exposure by an exposure system employing as a lamp light source a xenon lamp, halogen lamp, tungsten lamp, ultra-high pressure mercury vapor lamp, high-pressure mercury vapor lamp, low-pressure mercury vapor lamp or the like. It is, however, to be noted that the coating and pattern exposure methods shall not be limited to the above-described methods.

No particular limitation is imposed on the exposure conditions. To prevent discoloration or fading of the colored coating, however, it is preferred to set the exposure energy at 1,000 mJ/cm$^2$ or lower. When color resist inks are used, pixels can be formed on a substrate provided that pattern exposure is performed under such a light source and subsequently, development is performed as needed. Any developer can be used insofar as it dissolves unexposed areas but does not dissolve exposed areas. Specifically, a developer is an alkali solution containing various additives. As additives, an organic solvent, buffer, surfactant and the like can be contained. Although no particular limitation is imposed on the development process, a process such as dip development, spray development, brush development or ultrasonic development is usable. As a method for increasing the strength of the coating, post baking by a hot air oven may be conducted additionally. For the fabrication of a color filter with the above-described color resist inks, any one of other conventionally-known processes can be used.

The above description was directed to a fabrication process of a color filter with color filter inks making use of a photosensitive resin. However, the color filter ink according to the present invention may contain a non-photosensitive resin (thermosetting resin). In such a case, a conventionally-known process can also be used as is. Further, the above description was made primarily about the formation of pixels for a color filter. However, the pigment and pigment dispersion according to the present invention are also useful as colorants for various other applications, for example, synthetic or natural resins, paints, printing inks, writing inks, and inks for inkjet printers, and can provide excellent colored products.

EXAMPLES

The present invention will hereinafter be specifically described based on Synthesis Example, Examples and Comparative Examples, although the present invention shall not be limited to these Examples. In the following description, the designations of "part", "parts" and "%" are all on a weight basis unless otherwise specifically indicated. It is also to be noted that each particle size of pigment particles was an average value obtained by measuring the particles as observed under a transmission electron microscope.

Synthesis Example

1-Chloronaphthalene (500 parts) was added to tetrachlorophthalodinitrile (150 parts). After stirring the resultant mixture in a nitrogen atmosphere at room temperature for 30 minutes, boron trichloride (48 parts) was added. Subsequently, heating was conducted at a ramp rate of 1.6° C./min from room temperature to a temperature at which the formation of a subphthalocyanine began to take place (at that time, the reaction mixture turned into a violet color; the initiation temperature of the formation of the subphthalocyanine is 120° C. to 130° C.). The reaction mixture was heated further at the same ramp rate to 150° C., and at 150° C., was stirred under heating for 180 minutes. After allowed to cool down, the reaction mixture was introduced into methanol. The precipitate was collected by filtration, washed successively with water, acetone and toluene in this order, and then dried under heat in a vacuum (<1 mmHg, 180° C., 12 hr) to obtain a Cl-dodecachlorosubphthalocyanine boron complex represented by the below-described formula (143 parts, yield: 90%). As a result of x-ray diffraction of the thus-obtained compound, strong diffraction peaks appeared around diffraction angles (2θ) of 6.9°, 7.4°, 20.2°, 20.6°, 26.6° and 30.0° (FIG. 1). Further, its IR absorption spectrum presented at 880 cm$^{-1}$ a strong absorption ascribable to a B—Cl bond. When measured by a high-performance liquid chromatograph ("MODEL 860-CO", manufactured by JASCO Corporation; column: "YMC-PACK PRO C18", manufactured by YMC Co., Ltd.; mobile phase: THF:water=80:20), the compound in which X was a chlorine atom was found to account for 100%.

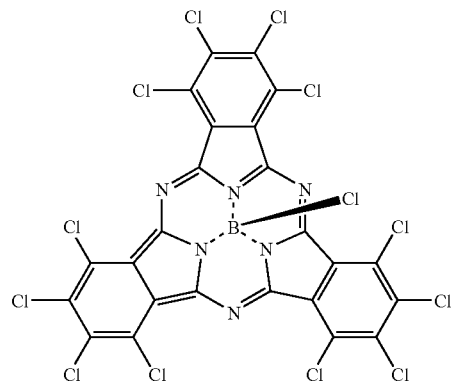

Example 1

The subphthalocyanine (200 parts) obtained in the Synthesis Example, fine sodium chloride powder (1,600 parts) and polyethylene glycol dimethyl ether (average molecular weight: 500, 200 parts) were charged in a kneader. Prekneading was initiated until an evenly-wet mass was formed in the kneader. Kneading and grinding processing was then conducted for 15 hours while controlling the cooling temperature and the flow rate of cooling water to keep the temperature of the contents at 40 to 60° C.

The resulting ground product was introduced into water (6,000 parts), followed by stirring for 1 hour. Filtration and water washing were then conducted to remove sodium chloride and polyethylene glycol dimethyl ether, and the resultant filter cake was then dried for 24 hours in a hot-air drier, which was controlled at 80° C., to obtain a subphthalocyanine pigment.

As a result of x-ray diffraction of the thus-obtained subphthalocyanine pigment, the strong peaks at the diffraction angles (2θ) of 7° to 30° became somewhat broader, and relatively strong peaks appeared around 7.0°, 12.3°, 20.4°, 23.4°, 25.8°, 29.9° and 31.2° (FIG. 2). As a result of an observation under a transmission electron microscope (TEM), the average particle size was determined to be 55 nm.

Example 2

The subphthalocyanine (400 parts) obtained in the Synthesis Example, fine sodium chloride powder (2,400 parts) and polyethylene glycol dimethyl ether (average molecular weight: 500, 400 parts) were charged in a kneader equipped with a pressure lid. Prekneading was initiated until an evenly-wet mass was formed in the kneader. The pressure lid was then closed, and kneading and grinding was initiated while holding the contents under a pressure of 6 kg/cm$^2$. The kneading and grinding processing was then continued for 10 hours while controlling the cooling temperature and the flow rate of cooling water to keep the temperature of the contents at 60 to 80° C.

The resulting ground product was introduced into water (10,000 parts), followed by stirring for 1 hour. Filtration and water washing were then conducted to remove sodium chloride and polyethylene glycol dimethyl ether, and the resultant filter cake was then dried for 24 hours in a hot-air drier, which was controlled at 80° C., to obtain a subphthalocyanine pigment.

As a result of x-ray diffraction of the thus-obtained subphthalocyanine pigment, the strong peaks at the diffraction angles (2θ) of 7° to 30° became somewhat broader, and relatively strong peaks appeared around 7.0°, 12.3°, 20.4°, 23.4°, 25.8°, 29.9° and 31.2°, as in Example 1. As a result of an observation under a transmission electron microscope (TEM), the average particle size was determined to be 60 nm.

Example 3

The subphthalocyanine (400 parts) obtained in the Synthesis Example, fine sodium chloride powder (2,400 parts) and 2,4-pentanediol (400 parts) were charged in a kneader equipped with a pressure lid. Prekneading was initiated until an evenly-wet mass was formed in the kneader. The pressure lid was then closed, and kneading and grinding was initiated while holding the contents under a pressure of 6 kg/cm$^2$. The kneading and grinding processing was then continued for 10 hours while controlling the cooling temperature and the flow rate of cooling water to keep the temperature of the contents at 60 to 80° C.

The resulting ground product was introduced into water (10,000 parts), followed by stirring for 1 hour. Filtration and water washing were then conducted to remove sodium chloride and 2,4-pentanediol, and the resultant filter cake was then dried for 24 hours in a hot-air drier, which was controlled at 80° C., to obtain a subphthalocyanine pigment.

As a result of x-ray diffraction of the thus-obtained subphthalocyanine pigment, the strong peaks at the diffraction angles (2θ) of 7° to 30° became somewhat broader, and relatively strong diffraction peaks appeared around 7.0°, 12.3°, 20.4°, 23.4°, 25.8°, 29.9° and 31.2°. As a result of an observation under a transmission electron microscope (TEM), the average particle size was determined to be 60 nm.

Example 4

Preparation of a Pigment Dispersion

The pigment (100 parts) obtained in Example 1, a cationic high-molecular dispersant (40 parts) and propylene glycol monomethyl ether acetate (860 parts) were added to a jar which contained a medium. Using a paint shaker, dispersion processing was conducted for 6 hours. Filtration was conducted to remove the medium to prepare a pigment dispersion (1,000 parts). As the medium for the paint shaker, 0.4-mm dia. glass beads were used at a packing volume of 40% or 0.4-mm dia. zirconia beads were used at a packing volume of 15%. The pigment dispersion obtained as described above showed low viscosity and low thixotropic properties.

(Production of a Color Resist Ink)

Combined were a 54.2 wt. % solution of an epoxy acrylate resin, which had bisphenol fluorene skeletons, in propylene glycol monomethyl ether acetate ("V-259ME", trade name; product of Nippon Steel Chemical Co., Ltd.; 130 g), dipentaerythritol hexaacrylate (47 parts), an epoxy resin having biphenyl skeletons ("EPIKOTE", trademark; product of Japan Epoxy Resins Co., Ltd.; 17 parts), 2-methyl-1-[4-(methylthio)phenyl]-2-morpholinopropan-1-one (7 parts), p,p'-bis(N,N-diethylamino)benzophenone (1 part), diethylene glycol dimethyl ether (196 parts), propylene glycol monomethyl ether acetate (75 parts), a surfactant (1 part) and a silane coupling agent (1 part). They were then thoroughly stirred to prepare a photosensitive resin solution (475 parts) which was soluble in a weak alkaline solution.

The above-described pigment dispersion (525 parts) was then added to the photosensitive resin solution. The resulting mixture was thoroughly stirred until it became a homogeneous solution, so that a color resist ink (1,000 parts) was produced. The color resist ink obtained as described above showed low viscosity and low thixotropic properties.

(Fabrication of a Model Color Filter)

The above-described color resist ink was coated by a spin coater on a blue plate glass substrate of 5 inches square and 1 mm thickness. In the course of the coating, the rotation speed of the spin coater was changed to fabricate a specimen which showed an intended chromaticy. After the specimen was prebaked at 80° C. for 3 minutes, a photomask was applied; and ultraviolet exposure was conducted at 200 mJ/cm$^2$ to harden the color resist ink at the exposed areas. The specimen was then developed for 60 seconds with a 0.4% aqueous solution of sodium carbonate to remove the color resist ink from the unexposed areas. Finally, the specimen was postbaked at 230° C. for 20 minutes to fabricate a model color filter.

(Assessment of Characteristics of the Model Color Filter)

The chromaticy (x coordinate, y coordinate) and brightness (Y value) of the model color filter were measured using a chromoscope ("COLOR ANALYZER TC-1800 MK2", trade name; manufactured by Tokyo Denshoku Co., Ltd.). Upon measurement, the CIE Standard illuminant C was used as an illuminant. Further, the model color filter was held between two polarizing plates, and its contrast value was determined from a ratio of the quantity of the light transmitted through the model color filter held between the two polarizing plates arranged in parallel Nichols to the quantity of the light transmitted through the model color filter held between the two polarizing plates arranged in crossed Nichols. As the heat resistance of the model color filter, a color difference ($\Delta E^*_{ab}$) after the postbaking was also measured, and the heat resistance was determined as follows:

$\Delta E^*_{ab} < 3$: Acceptable $\Delta E^*_{ab} \geq 3$: Not acceptable

The chromaticy, brightness, heat resistance and contrast value of the model color filter obtained in this Example are shown in Table 1. The spectral characteristics of the model color filter had such high-level brightness and saturation that a blue emission from a three-wavelength fluorescent lamp was effectively transmitted but red and green emissions from the three-wavelength fluorescent lamp were effectively blocked. Further, the hardened film of the color resist ink had such good coat quality that the film thickness was uniform and the film was free of aggregated precipitates and the like.

Example 5

A color resist ink was produced by a similar procedure as in Example 4 except that the subphthalocyanine pigment was changed to the pigment obtained in Example 2. In a similar manner as in Example 4, a model color filter was then fabricated, and its chromaticy, brightness, heat resistance and contrast value were measured. The results are shown in Table 1. The spectral characteristics of the model color filter had such high-level brightness and saturation that a blue emission from a three-wavelength fluorescent lamp was effectively transmitted but red and green emissions from the three-wavelength fluorescent lamp were effectively blocked. Further, the hardened film of the color resist ink had such good coat quality that the film thickness was uniform and the film was free of aggregated precipitates and the like.

Example 6

A color resist ink was produced by a similar procedure as in Example 4 except that the subphthalocyanine pigment was changed to the pigment obtained in Example 3. In a similar manner as in Example 4, a model color filter was then fabricated, and its chromaticy, brightness, heat resistance and contrast value were measured. The results are shown in Table 1. The spectral characteristics of the model color filter had such high-level brightness and saturation that a blue emission from a three-wavelength fluorescent lamp was effectively transmitted but red and green emissions from the three-wavelength fluorescent lamp were effectively blocked. Further, the hardened film of the color resist ink had such good coat quality that the film thickness was uniform and the film was free of aggregated precipitates and the like.

Referential Example 1

A pigment dispersion was prepared by a similar procedure as in Example 4 except that the subphthalocyanine pigment was changed to Pigment Blue 15:6.

Example 7

A color resist ink was produced by a similar procedure as in Example 4 except that the pigment dispersion was changed to a mixture of the pigment dispersion (262.5 parts) obtained in Example 3 and the pigment dispersion (262.5 parts) obtained in Referential Example 1. In a similar manner as in Example 4, a model color filter was then fabricated, and its chromaticy, brightness, heat resistance and contrast value were measured. The results are shown in Table 1. The spectral characteristics of the model color filter had such high-level brightness and saturation that a blue emission from a three-wavelength fluorescent lamp was effectively transmitted but red and green emissions from the three-wavelength fluorescent lamp were effectively blocked. Further, the hardened film of the color resist ink had such good coat quality that the film thickness was uniform and the film was free of aggregated precipitates and the like.

Comparative Example 1

The subphthalocyanine (200 parts) obtained in the Synthesis Example, fine sodium chloride powder (1,200 parts) and polyethylene glycol dimethyl ether (average molecular weight: 500, 200 parts) were charged in a kneader. Prekneading was initiated until an evenly-wet mass was formed in the kneader. Kneading and grinding processing was then conducted for 8 hours while controlling the cooling temperature and the flow rate of cooling water to keep the temperature of the contents at 40 to 60° C.

The resulting ground product was introduced into water (6,000 parts), followed by stirring for 1 hour. Filtration and water washing were then conducted to remove sodium chloride and polyethylene glycol dimethyl ether, and the resultant filter cake was then dried for 24 hours in a hot-air drier, which was controlled at −80° C., to obtain a subphthalocyanine pigment.

As a result of x-ray diffraction of the thus-obtained subphthalocyanine pigment, the strong peaks at the diffraction angles (2θ) of 7° to 30° became somewhat broader, and relatively strong peaks appeared around 7.0°, 12.3°, 20.4°, 23.4°, 25.8°, 29.9° and 31.2°. As a result of an observation under a transmission electron microscope (TEM), the average particle size was determined to be 150 nm.

Comparative Example 2

A color resist ink was produced by a similar procedure as in Example 4 except that the subphthalocyanine pigment was changed to the pigment obtained in Comparative Example 1. In a similar manner as in Example 4, a model color filter was then fabricated, and its chromaticy, brightness, heat resistance and contrast value were measured. The results are shown in Table 1.

Comparative Example 3

A color resist ink was produced by a similar procedure as in Example 4 except that the subphthalocyanine pigment was changed to a subphthalocyanine pigment formed by dry-milling the subphthalocyanine of the Synthesis Example to finely divide it primarily into particles of 80 nm in average particle size and presenting diffraction peaks at diffraction angles (2θ) of 6.9°, 7.4°, 20.2°, 20.6°, 26.6° and 30.0° in x-ray diffraction. In a similar manner as in Example 4, a model color filter was then fabricated, and its chromaticy, brightness, heat resistance and contrast value were measured. The results are shown in Table 1.

Referential Example 2

A pigment dispersion was prepared by a similar procedure as in Example 4 except that the subphthalocyanine pigment was changed to Pigment Violet 23.

Comparative Example 4

A color resist ink was produced by a similar procedure as in Example 4 except that the pigment dispersion was changed to a mixture of the pigment dispersion (367.5 parts) obtained in Referential Example 1 and the pigment dispersion (157.5 parts) obtained in Referential Example 2. In a similar manner as in Example 4, a model color filter was then fabricated, and its chromaticy, brightness, heat resistance and contrast value were measured. The results are shown in Table 1.

TABLE 1

|  | x | y | Y(%) | Heat resistance | Contrast value |
|---|---|---|---|---|---|
| Example 4 | 0.179 | 0.100 | 11.60 | Acceptable | 900 |
| Example 5 | 0.180 | 0.100 | 11.64 | Acceptable | 600 |
| Example 6 | 0.175 | 0.100 | 11.60 | Acceptable | 800 |
| Example 7 | 0.145 | 0.100 | 11.45 | Acceptable | 1700 |
| Comp. Ex. 2 | 0.178 | 0.100 | 11.60 | Acceptable | 200 |
| Comp. Ex. 3 | 0.177 | 0.100 | 9.42 | Not acceptable | 110 |
| Comp. Ex. 4 | 0.153 | 0.100 | 10.72 | Acceptable | 500 |

Example 8

The subphthalocyanine (200 parts) obtained in the Synthesis Example, fine sodium chloride powder (1,600 parts) and diethylene glycol (200 parts) were charged in a kneader. Prekneading was initiated until an evenly-wet mass was formed in the kneader. Kneading was then conducted for 6 hours while cooling or heating the kneader to control the temperature of the contents at 70 to 100° C. The resulting ground product was introduced into water (6,000 parts), followed by stirring for 1 hour. Filtration and water washing were then conducted to remove sodium chloride and diethylene glycol, and the resultant filter cake was then dried for 24 hours in a hot-air drier, which was controlled at 80° C., to obtain a subphthalocyanine pigment.

As a result of x-ray diffraction of the thus-obtained subphthalocyanine pigment, broad diffraction peaks appeared over diffraction angles (2θ) of 20° to 30° (FIG. 3). Further, its IR absorption spectrum presented at 1,064 cm$^{-1}$ a weak absorption ascribable to a B—O bond in addition to a weak absorption ascribable to a B—Cl bond at 880 cm$^{-1}$. When measured by a high-performance liquid chromatograph ("MODEL 860-CO", manufactured by JASCO Corporation; column: "YMC-PACK PRO C18", manufactured by YMC Co., Ltd.; mobile phase: THF:water=80:20), the subphthalocyanine pigment in which X was a chlorine atom was found to account for 18%, and the subphthalocyanine pigment in which X was a reaction residue of diethylene glycol was found to account for 82%. As a result of an observation under a transmission electron microscope (TEM), the average particle size was determined to be 55 nm.

Example 9

The subphthalocyanine (400 parts) obtained in the Synthesis Example, fine sodium chloride powder (2,400 parts) and diethylene glycol (400 parts) were charged in a kneader equipped with a pressure lid. Prekneading was initiated until an evenly-wet mass was formed in the kneader. The pressure lid was then closed, and kneading and grinding was initiated while holding the contents under a pressure of 6 kg/cm$^2$. Kneading was then conducted for 6 hours while cooling or heating the kneader to control the temperature of the contents at 70 to 100° C. The resulting ground product was introduced into water (10,000 parts), followed by stirring for 1 hour. Filtration and water washing were then conducted to remove sodium chloride and diethylene glycol, and the resultant filter cake was then dried for 24 hours in a hot-air drier, which was controlled at 80° C., to obtain a subphthalocyanine pigment.

As a result of x-ray diffraction of the thus-obtained subphthalocyanine pigment, broad diffraction peaks appeared over diffraction angles (2θ) of 20° to 30° as in Example 8. Further, its IR absorption spectrum presented at 1,064 cm$^{-1}$ a weak absorption ascribable to a B—O bond in addition to a weak absorption ascribable to a B—Cl bond at 880 cm$^{-1}$. When measured by a high-performance liquid chromatograph ("MODEL 860-CO", manufactured by JASCO Corporation; column: "YMC-PACK PRO C18", manufactured by YMC Co., Ltd.; mobile phase: THF:water=80:20), the subphthalocyanine pigment in which X was a chlorine atom was found to account for 27%, and the subphthalocyanine pigment in which X was a reaction residue of diethylene glycol was found to account for 73%. As a result of an observation under a transmission electron microscope (TEM), the average particle size was determined to be 60 nm.

Example 10

A pigment dispersion was prepared in a similar manner as in Example 4 except that the pigment (100 parts) obtained in Example 8 was used. The pigment dispersion showed low viscosity and low thixotropic properties. Using the pigment dispersion, a color resist ink was produced in a similar manner as in Example 4. The ink showed low viscosity and low thixotropic properties. Using the ink, a model color filter was fabricated in a similar manner as in Example 4, and the model color filter was then assessed in a similar manner as in Example 4. The chromaticy, brightness, heat resistance and contrast value of the model color filter obtained in this Example are shown in Table 2. The spectral characteristics of the model color filter had such high-level brightness and saturation that a blue emission from a three-wavelength fluorescent lamp was effectively transmitted but red and green emissions from the three-wavelength fluorescent lamp were effectively blocked. Further, the hardened film of the color resist ink had such good coat quality that the film thickness was uniform and the film was free of aggregated precipitates and the like.

Example 11

A color resist ink was produced by a similar procedure as in Example 4 except that the subphthalocyanine pigment was changed to the pigment obtained in Example 9. In a similar manner as in Example 4, a model color filter was then fabricated, and its chromaticity, brightness, heat resistance and contrast value were measured. The results are shown in Table 2. The spectral characteristics of the model color filter had such high-level brightness and saturation that a blue emission from a three-wavelength fluorescent lamp was effectively transmitted but red and green emissions from the three-wavelength fluorescent lamp were effectively blocked. Further, the hardened film of the color resist ink had such good coat quality that the film thickness was uniform and the film was free of aggregated precipitates and the like.

Comparative Example 5

The subphthalocyanine (200 parts) obtained in the Synthesis Example, fine sodium chloride powder (1,600 parts) and diethylene glycol (200 parts) were charged in a kneader. Pre kneading was initiated until an evenly-wet mass was formed in the kneader. While cooling or heating the kneader to control the temperature of the contents at 80 to 100° C., kneading was then conducted for 3 hours to perform grinding processing.

The resulting ground product was introduced into water (6,000 parts), followed by stirring for 1 hour. Filtration and water washing were then conducted to remove sodium chloride and diethylene glycol, and the resultant filter cake was then dried for 24 hours in a hot-air drier, which was controlled at 80° C., to obtain a subphthalocyanine pigment.

An IR absorption spectrum of the thus-obtained subphthalocyanine pigment presented at 1,064 $cm^{-1}$ a weak absorption ascribable to a B—O bond in addition to a weak absorption ascribable to a B—Cl bond at 880 $cm^{-1}$. When measured by a high-performance liquid chromatograph ("MODEL 860-CO", manufactured by JASCO Corporation; column: "YMC-PACK PRO C18", manufactured by YMC Co., Ltd.; mobile phase: THF:water=80:20), the subphthalocyanine pigment in which X was a chlorine atom was found to account for 75%, and the subphthalocyanine pigment in which X was a reaction residue of diethylene glycol was found to account for 25%. As a result of an observation under a transmission electron microscope (TEM), the average particle size was determined to be 150 nm.

Comparative Example 6

A color resist ink was produced by a similar procedure as in Example 4 except that the subphthalocyanine pigment was changed to the pigment obtained in Comparative Example 5. In a similar manner as in Example 4, a model color filter was then fabricated, and its chromaticy, brightness, heat resistance and contrast value were measured. The results are shown in Table 2.

TABLE 2

|  | x | y | Y(%) | Heat resistance | Contrast value |
|---|---|---|---|---|---|
| Example 10 | 0.204 | 0.100 | 11.13 | Acceptable | 1070 |
| Example 11 | 0.203 | 0.100 | 11.30 | Acceptable | 1085 |
| Comp. Ex. 6 | 0.195 | 0.100 | 11.30 | Acceptable | 256 |

INDUSTRIAL APPLICABILITY

According to the present invention as described above, a subphthalocyanine pigment is obtained by kneading a subphthalocyanine together with an inorganic salt and water-soluble organic solvent such that the subphthalocyanine is finely divided. The pigment is excellent in brightness, saturation, heat resistance and the like. Color filters obtained by using an ink, which uses as a colorant a dispersion containing the pigment, is equipped with high-level brightness, saturation and contrast. The pigment is, therefore, extremely useful in that it enables the fabrication of high-quality liquid crystal displays. The pigment dispersion according to the present invention is useful as a colorant for paints required to have high glossiness, writing inks required to have high transparency, inks for inkjet printers, printing inks and the like, in addition to inks for color filters.

Figure 1:
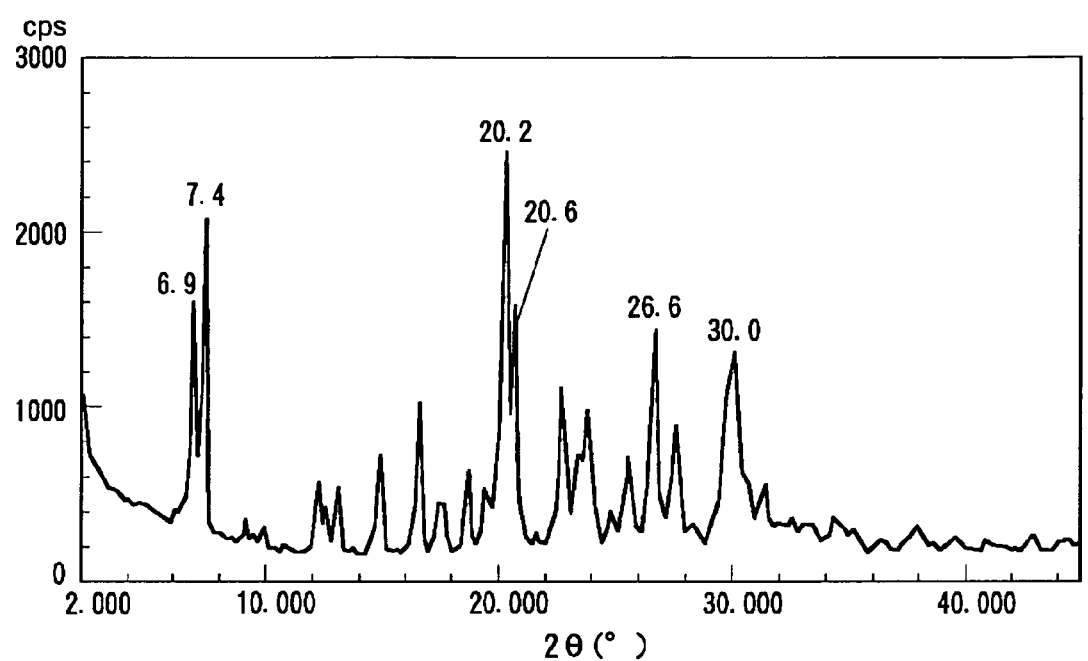
[FIG. 1] An x-ray diffraction spectrum of the subphthalocyanine of the Synthesis Example.
Figure 2:
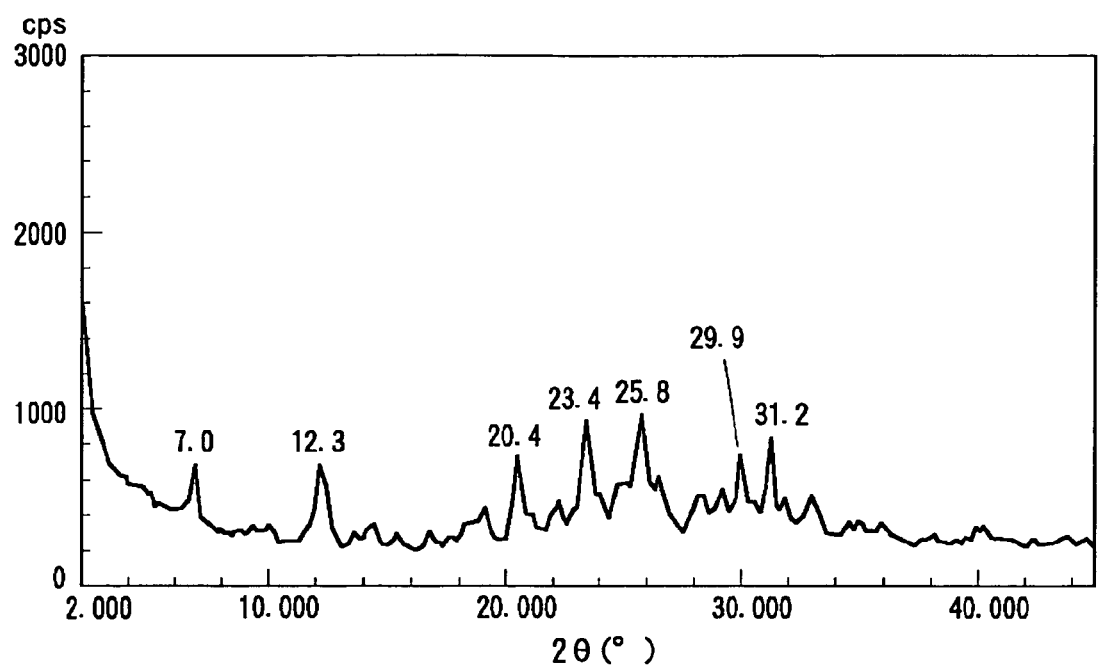
[FIG. 2] An x-ray diffraction spectrum of the subphthalocyanine pigment of Example 1.
Figure 3:
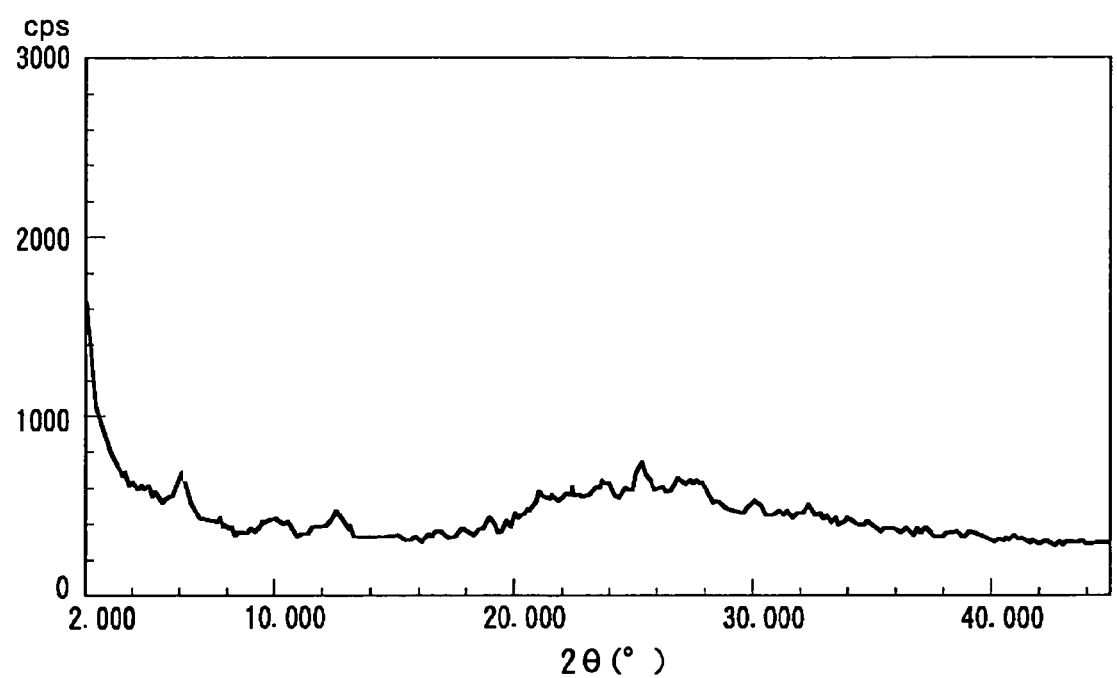
[FIG. 3] An x-ray diffraction spectrum of the subphthalocyanine pigment of Example 8.

The invention claimed is:

1. A subphthalocyanine pigment which is represented by the following formula (1):

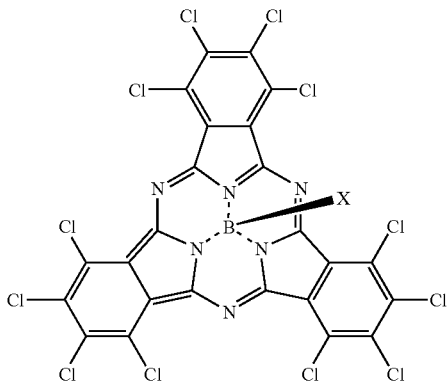

Formula (1)

in which X consists of (A) a halogen atom and (B) a residual group formed by removing a hydrogen atom from a hydroxyl group in a hydroxyl-containing, water-soluble organic solvent and a ratio (A:B) of said halogen atom to said residual group is 27:73 to 18:82, presenting broad diffraction peaks over diffraction angles (2θ) of 20° to 30° in x-ray diffraction, and having an average particle size of 120 to 20 nm.

2. A pigment dispersion comprising a medium and a subphthalocyanine pigment according to claim 1 dispersed in said medium.

3. A pigment dispersion according to claim 2, further comprising a blue to violet pigment and/or a blue to violet dye.

4. A pixel-forming ink for color filters, comprising as a colorant component a pigment dispersion according to claim 2.

5. A pixel-forming ink for color filters according to claim 4, further comprising a photosensitive resin and/or monomer as a film-forming material and a photopolymerization initiator.

* * * * *